(12) United States Patent
Nomura

(10) Patent No.: US 6,731,702 B1
(45) Date of Patent: May 4, 2004

(54) NULL SYMBOL POSITION DETECTING METHOD, NULL SYMBOL POSITION DETECTING APPARATUS, AND RECEIVER

(75) Inventor: Kiyoshi Nomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/559,059

(22) Filed: Apr. 28, 2000

(30) Foreign Application Priority Data

Apr. 30, 1999 (JP) .......................................... P11-123465

(51) Int. Cl.[7] .............................................. H04L 27/06
(52) U.S. Cl. ........................ 375/343; 375/344; 375/364; 375/368; 370/509; 455/182.2; 455/192.2
(58) Field of Search ................................ 375/342–344, 375/362, 364, 368, 326, 324; 370/509, 514, 520; 455/182.1, 182.2, 192.1, 192.2; 329/302, 306, 323, 358

(56) References Cited

U.S. PATENT DOCUMENTS

| | | | |
|---|---|---|---|
| 5,602,835 A | * | 2/1997 | Seki et al. .................... 370/206 |
| 5,991,289 A | * | 11/1999 | Huang et al. ................ 370/350 |
| 6,108,353 A | * | 8/2000 | Nakamura et al. .......... 370/504 |
| 6,314,083 B1 | * | 11/2001 | Kishimoto et al. ......... 370/210 |

* cited by examiner

Primary Examiner—Stephen Chin
Assistant Examiner—Dac V. Ha
(74) Attorney, Agent, or Firm—Jay H. Maioli

(57) ABSTRACT

A null symbol position detecting method, apparatus, and receiver for quickly and accurately detecting a null symbol from a broadcast signal containing it in any broadcast signal receiving environment. A digital audio broadcast (DAB) signal is received and tuned in and this signal is I/Q-demodulated. The I and Q signal obtained by the I/Q demodulation are delayed by an I-component delay circuit and a Q-component delay circuit respectively by one valid symbol period to form a delay signal Id and a delay signal Qd respectively. Correlation is obtained between the delay signals Id and Qd and the signals I and Q which are not delayed. The peak of this correlation is determined by a peak decision circuit. The level pattern of the peak is detected by a level pattern decision circuit. If a low-level peak is found, the length of the null symbol period is computed by a time interval decision circuit to determine whether the length is the same as that of the null symbol included in the received and tuned-in DAB signal, thereby detecting the null symbol position.

12 Claims, 6 Drawing Sheets

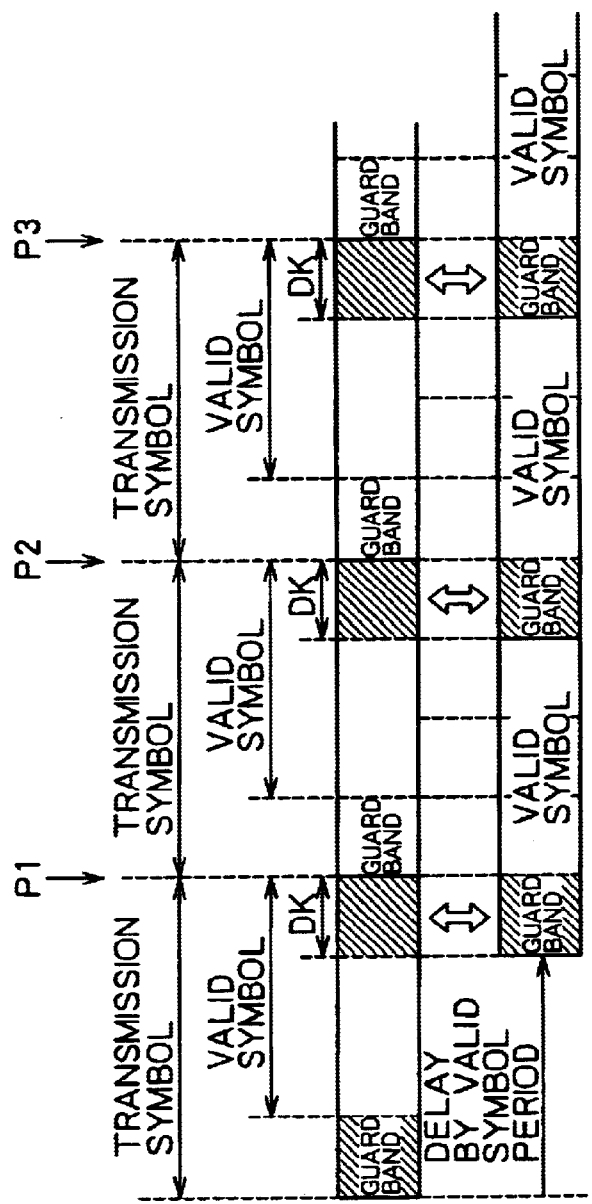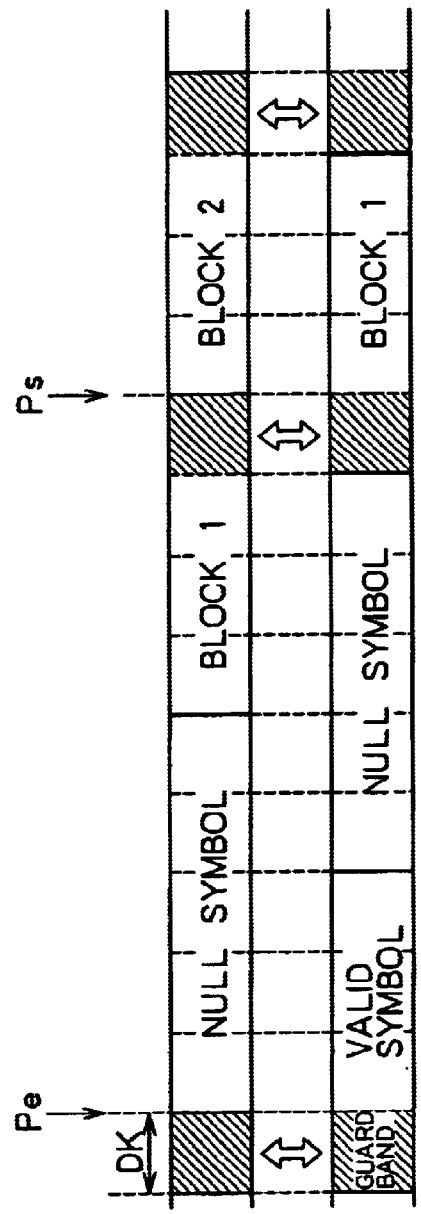
F I G. 3A
F I G. 3B

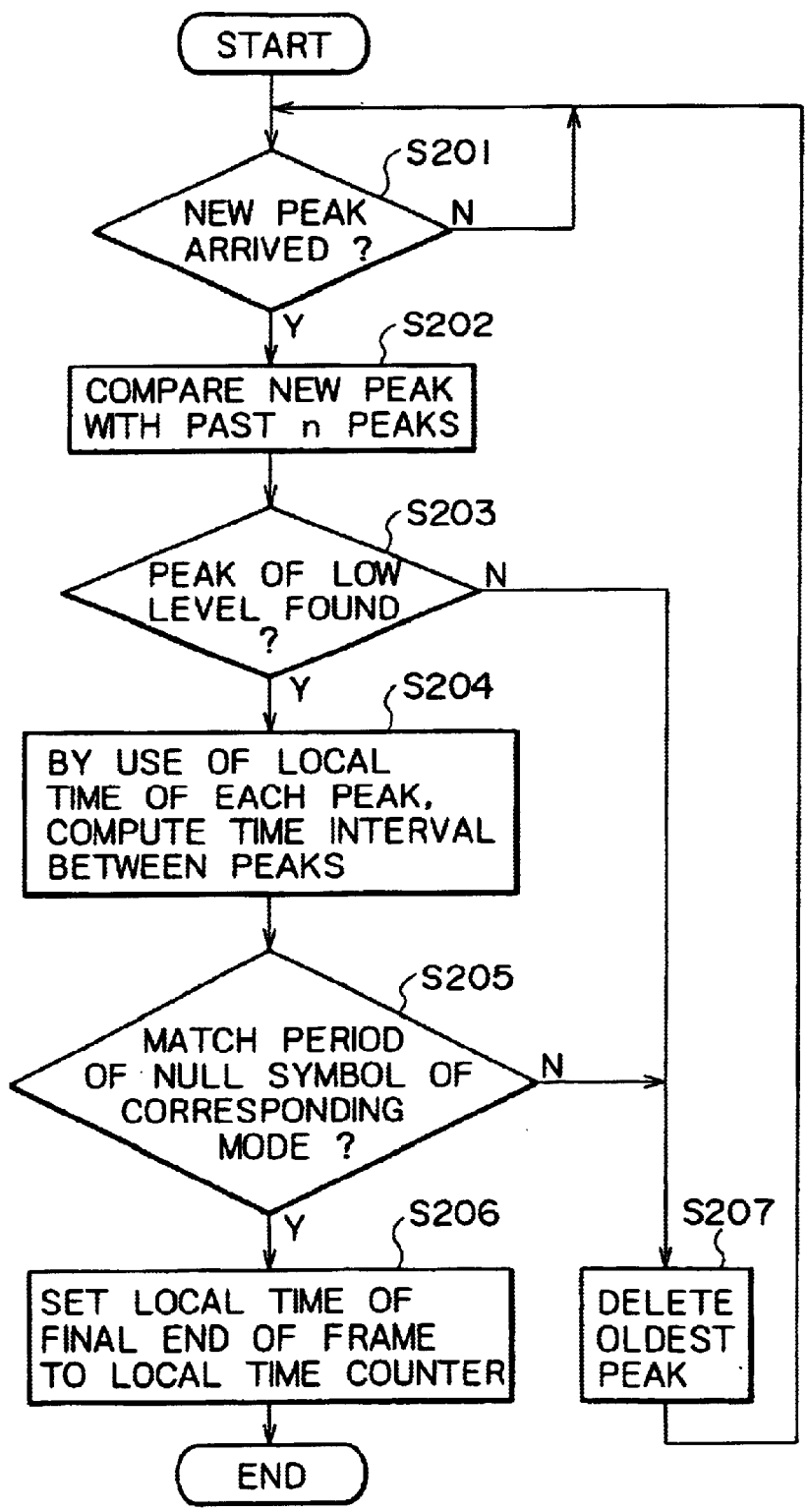

RECEIVED SIGNAL

NULL DETECTION SIGNAL

RECEIVED SIGNAL

NULL DETECTION SIGNAL

NULL SYMBOL POSITION DETECTING METHOD, NULL SYMBOL POSITION DETECTING APPARATUS, AND RECEIVER

BACKGROUND OF THE INVENTION

The present invention generally relates to a null symbol position detecting method and a null symbol position detecting apparatus for detecting a null symbol from signals such as DAB (Digital Audio Broadcast) signal for example and to a receiver for receiving such a signal including null symbols.

Europe has started the provision of digital audio broadcast services of the European standard (Eureka 147) called DAB. DAB transmits a broadcast signal (or an ensemble signal) formed by multiplexing audio data of plural broadcast programs, various control information, and additional information. In this case, the audio data are encoded highly efficiently (data-compressed) by an international standard MPEG audio scheme to be transmission-line encoded by use of error-correction convolutional coding for example.

The bit streams of the encoded audio data and information are interleaved and modulated by OFDM (Orthogonal Frequency Division Multiplex) before being transmitted.

This DAB broadcast signal has a frame structure as shown in FIG. 5. Namely, each frame consists of a synchronization channel, an FIC (Fast Information Channel), and an MSC (Main Service Channel).

As shown in FIG. 5, there are two synchronization symbols. A null symbol, one of the synchronization symbols, indicates the start position of each frame. In this null symbol, a TII (Transmitter Identification Information) is inserted by use of plural carriers. However, the null symbol has no information to be transmitted as data. A synchronization symbol that follows the null symbol provides synchronization information for obtaining frequency offset and time offset in the receiver.

There are three symbols in FIC (block 1 through block 3) for transmitting various pieces of broadcast-associated information if a DAB signal of mode 1 to be described is taken as example. For example, these FIC blocks convey an array of multiplexed broadcast programs, labels such as broadcast station name (ensemble label) and program name (program label), and information indicative of broadcast program type.

The MSC has data fields (transmission symbols) of plural multiplexed broadcast programs as shown in FIG. 5. Namely, plural pieces of audio data multiplexed on a DAB signal are the MSC data fields. Each of the MSC data fields consists of a guard band (or a guard interval) and a valid symbol as shown in FIG. 5.

The information of each guard band period is made equal to a part of the period of each valid symbol, for example, the information of a period indicated by period DK at the end of each valid symbol as shown in FIG. 5. This guard band significantly improves the quality of reception of a DAB signal on a moving vehicle like an automobile in such highly radio-reflective environments as urban and hilly districts, as compared with other modulation schemes. Namely, as long as a time difference between the first and last reflected waves does not exceed the guard band period, no inter-symbol interference takes place and there is no need for waveform equalization.

A DAB receiver uses the above-mentioned FIC-included information for broadcast program identification and the information about the multiplexing to extract and reproduce a user-specified broadcast program from the DAB signal multiplexed with plural broadcast programs, allowing the user to listen to audio broadcast of high sound quality.

In order to receive the above-mentioned DAB signal to tune in to a desired broadcast program, the beginning of each DAB signal frame must be identified to accurately extract the information that follows the synchronization symbol. Therefore, null symbol detection is executed in the receiver.

Normally, a null symbol position is detected by analog signal processing. Namely, when a DAB signal is received and envelope-detected, the level of the envelope waveform becomes low in the null symbol portion. Therefore, by comparing the envelope waveform with a reference voltage, a null detection signal can be generated. FIG. 6A shows a waveform of a received DAB signal, in which the low-level portion indicates the null symbol portion.

As a result of the comparison between the DAB signal (the received signal) and the reference signal shown in FIG. 6A, a null detection signal is formed in which it goes low during the period of the null symbol and high in the other portions as shown in FIG. 6B.

However, if the reference signal is set improperly or if a DAB signal is received on a moving vehicle on which an unwanted phenomenon such as fading takes place, the received signal is disturbed, resulting in poor reception of the DAB signal or causing a null detection signal to occur at positions where it should not.

For example, when a moving vehicle such as an automobile is moving at a high speed and a DAB signal is received on this moving vehicle, the envelope of the received signal becomes broad and narrow as shown in FIG. 7A. Namely, the envelope of the received signal becomes narrow in other portions than the null symbol period.

If this happens, the null detection signal becomes low indicative of the detection of a null symbol also at positions other than where it should be present, thereby causing null symbol erroneous detection, thereby failing quick and correct null symbol detection.

SUMMARY OF THE INVENTION

It is therefore an object of the present invention to provide a null symbol position detecting method, a null symbol position detecting apparatus based on this method, and a receiver for receiving a broadcast signal including a null symbol, these being capable of quick and correct null symbol detection in any situation when using the broadcast signal including a null symbol.

In carrying out the invention and according to one aspect thereof, there is provided a null symbol position detecting method for receiving a signal and detecting a null symbol position from the received signal, in the signal of which a unit transmission frame has at least a null symbol at the beginning of the unit transmission frame and a plurality of transmission symbols following the null symbol, each of the plurality of transmission symbols having a guard band and a valid symbol, information included in a period of the guard band is made equal to information included in the valid symbol at an end thereof, and a length of a period of the null symbol is made different from a length of a period of each of the plurality of transmission symbols, the method comprising the steps of computing a correlation value between the received signal and a signal obtained by delaying the received signal by a length of a period of the valid symbol, and detecting the null symbol position on the basis of a variation in a period in which the correlation value is computed above a predetermined level.

According to the null symbol position detecting method, a signal multiplexed with a null symbol and one or more transmission symbols in a time division manner is received. A correlation value between the received signal and a signal obtained by delaying the received signal by one valid symbol period is computed. Because of the length of null symbol period is different from the length of transmission symbol period, the period in which a correlation value higher than a certain level is computed varies even within a unit transmission section (or a frame). A null symbol position is detected on the basis of this variation.

Thus, a null symbol position is detected on the basis of the variation in the period in which a correlation value higher than a certain level is computed. This permits the quick and accurate detection of null symbol position without being affected by the variation in the reception level of a received signal due to fading for example, always ensuring the quick and accurate null symbol position detection.

In carrying out the invention and according to another aspect thereof, there is provided a null symbol position detecting method, wherein a moving average for a period equal to the period of the guard band is computed for the correlation value between the received signal and a signal obtained by delaying the received signal by a length of a period of the valid symbol and the null symbol position is detected on the basis of a variation in a period in which the computed moving average peaks.

According to the null symbol position detecting method, a correlation value between the received signal and a signal obtained by delaying the received signal by one valid symbol period is computed. Because of the length of null symbol period is different from the length of transmission symbol period, the correlation value occurrence pattern varies within the unit transmission section in time or in correlation value level. The null symbol position is detected on the basis of this correlation value occurrence pattern.

Thus, a null symbol position is detected on the basis of correlation value occurrence pattern. This permits the quick and accurate detection of null symbol position without being affected by the variation in the reception level of a received signal due to fading for example, always ensuring the quick and accurate null symbol position detection.

In carrying out the invention and according to still another aspect thereof, there is provided a null symbol position detecting method, wherein the null symbol position is detected on the basis of a time interval in which the moving average peaks.

According to the null symbol position detecting method, the information of guard band period is made equal to the information of a portion (end portion) at the end of a valid symbol following that guard band, the portion (period) having the same length as the guard band period.

Therefore, for the correlation value between the received signal and a signal obtained by delaying the received signal by the valid symbol period, a moving average is computed for a period equal to the guard band period. Consequently, the value of the moving average of the correlation value is peaked at the end of each transmission symbol (namely, in the boundary between transmission symbols).

In the period in which transmission symbols continue, a peak-to-peak period of moving average correctly matches the transmission symbol period but, in the null symbol period, the peak level goes low. Therefore, the peak variation period and the peak occurrence pattern vary regularly, comparatively facilitating null symbol detection.

Thus, the null symbol position in the received signal can be quickly and accurately detected by use of the peak of the moving average of the correlation value as a correlation value and on the basis of the variation in the period of this peak or on the basis of the peak occurrence pattern.

In carrying out the invention and according to yet another aspect thereof, there is provided a null symbol position detecting method for receiving a signal and detecting a null symbol position from the received signal, in the signal of which a unit transmission frame has at least a null symbol at the beginning of the unit transmission frame and a plurality of transmission symbols following the null symbol, each of the plurality of transmission symbols having a guard band and a valid symbol, information included in a period of the guard band is made equal to information included in the valid symbol at an end thereof, and a length of a period of the null symbol is made different from a length of a period of each of the plurality of transmission symbols, the method comprising the steps of computing a correlation value between the received signal and a signal obtained by delaying the received signal by a length of a period of the valid symbol, computing, for the correlation value, a moving average for a period equal to the period of the guard band to detect peaking of the moving average, and detecting the null symbol position on the basis of an occurrence pattern in which the moving average peaks and a time interval in which the moving average peaks.

According to the null symbol position detecting method, the information of guard band period is made equal to the information of a portion (end portion) at the end of a valid symbol following that guard band, the portion (period) having the same length as the guard band period.

Therefore, for the correlation value between the received signal and a signal obtained by delaying the received signal by the valid symbol period, a moving average is computed for a period equal to the guard band period. Consequently, the value of the moving average of the correlation value is peaked at the end of each transmission symbol (namely, in the boundary between transmission symbols).

In the period in which transmission symbols continue, a peak-to-peak period of moving average correctly matches the transmission symbol period but, in the null symbol period, the peak level goes low. Hence, first, the reception of the null symbol is detected on the basis of the occurrence pattern of the moving average peak. Then, the peak-to-peak time interval is obtained. It is determined whether this time interval includes the null symbol period, thereby accurately detecting the null symbol position in the received signal.

The use of the moving average peak of the correlation value between received signals allows the detection of null symbol position without being affected by the reception level of the received signal. And the use of the peak-to-peak time interval allows the accurate detection of null symbol position without involving erroneous detection.

BRIEF DESCRIPTION OF THE DRAWINGS

These and other objects of the invention will be seen by reference to the description, taken in connection with the accompanying drawing, in which:

FIG. 3A and FIG. 3B are diagrams illustrating a method of obtaining the moving average of correlation values to be executed in the AFC shown in FIG. 2;

FIG. 4 is a flowchart describing null symbol detection processing;

DETAILED DESCRIPTION OF PREFERRED EMBODIMENTS

This invention will be described in further detail by way of a preferred embodiment with respect to a null symbol position detecting method, a null symbol position detecting apparatus, and a receiver based on these method and apparatus with reference to the accompanying drawings. The following description of the preferred embodiment will be made by use of an example in which digital audio broadcast based on European standard (Eureka 147) is received and tuned in (this broadcast is hereinafter referred to as DAB).

DAB has several modes. In the embodiment to be described below, DAB signals of mode 1 are used for example. Mode 1 is used for a Single Frequency Network. In this mode, length Tf of a unit transmission section (or a frame) is 96 ms, symbol length Ts is 1 ms, and guard band length Tg is 246 μs.

Figure 1:
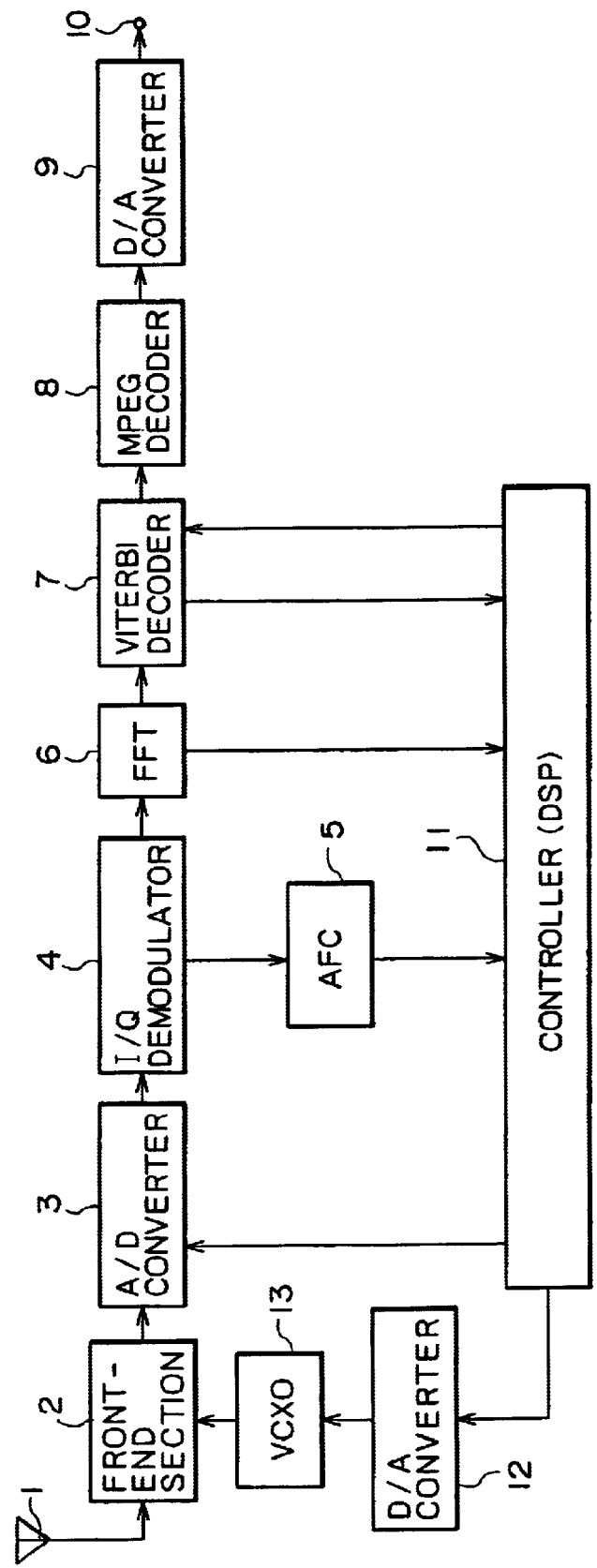
FIG. 1 is a block diagram illustrating a receiver practiced as one preferred embodiment of the invention.

FIG. 1 is a block diagram illustrating a DAB receiver of the above-mentioned preferred embodiment. As shown, the embodied receiver comprises an antenna 1, a front-end section (a receive and tune-in section) 2, an A/D converter 3, an I/Q demodulator 4, an automatic frequency controller (hereinafter referred to as AFC) 5, a Fast Fourier Transform section (hereinafter referred to as FFT) 6, a Viterbi decoder 7, an MPEG decoder 8, a D/A converter 9, an output terminal 10, a controller based on DSP (Digital Signal Processor) 11, a D/A converter 12, and a voltage-controlled crystal oscillator (hereinafter referred to as VCXO) 13.

A DAB signal received at the antenna 1 is supplied to the front-end section 2. The front-end section 2 comprises a tuner and an intermediate frequency converter. On the basis of the oscillation frequency supplied from the VCXO 13 controlled by the controller 11, the front-end section 2 receives and tunes in to the DAB signal, converts the tuned-in broadcast signal into an intermediate frequency signal, and supplies it to the A/D converter 3.

The A/D converter 3 converts the analog intermediate frequency signal into a digital signal and supplies it to the I/Q demodulator 4. From this digital intermediated frequency signal, the I/Q demodulator 4 demodulates signals of I-component and Q-component of a baseband signal and supplies them to the AFC 5 and the FFT 6.

The AFC 5, to which the null symbol position detecting method and apparatus according to the invention are applied, quickly and correctly detects the position of the null symbol included in the received and tuned-in DAB signal and supplies the data obtained by this processing to the controller 11. This processing will be detailed later.

The FFT 6 OFDM-demodulates the I-component and Q-component signals supplied from the I/Q demodulator 4. Of the demodulated signals, a synchronization symbol (or a TFPR symbol) is supplied to the controller 11. The OFDM-demodulated FIC information and MSC information are supplied to the Viterbi decoder 7.

The controller 11 obtains the frequency offset of the received and tuned-in DAB signal on the basis of the data obtained by the null symbol detection processing by the AFC 5 and the result of synchronization symbol frequency analysis from the FFT 6. The obtained frequency offset is converted by the D/A converter 12 into an analog signal, which is supplied to the VCXO 13.

Thus, the oscillation frequency of the VCXO 13 is adjusted to correct the frequency offset of the DAB signal received and tuned in by the front-end section 2 and is supplied to the A/D converter 3. This frequency offset correction processing is performed as an initial operation. In this receiver, this processing is performed to receive a DAB signal or change tuned-in DAB signals.

Then, the DAB signal corrected in its frequency offset is supplied to the Viterbi decoder 7 through the I/Q demodulator 4 and the FFT 5. The Viterbi decoder 4 performs Viterbi decoding processing on the supplied DAB signal to restore the original DAB signal. Of the restored DAB signal, the data of the FIC portion is supplied to the controller 11.

A selection control signal according to the selection command given by the user of this receiver is supplied from the controller 11 to the Viterbi decoder 7. Of the plural broadcast programs multiplexed on the DAB signal, the audio data of the broadcast program specified by the selection control signal is extracted to be supplied to the MPEG decoder 8.

The MPEG decoder 8 decompresses the MPEG-compressed audio data and supplies the decompressed audio data to the D/A converter 9. The D/A converter 9 converts the decompressed audio data into an analog signal, which is outputted through the output terminal 10. The audio signal is then supplied to a loudspeaker for example to be sounded as the broadcast program specified by the user.

In the embodied receiver, the detection of the null symbol position of a received and tuned-in DATA signal is not performed by use of the envelope waveform of the received signal. Rather, the null symbol position is detected by computing, in the AFC 5, the correlation value between the received and tuned-in DAB signal and a signal obtained by delaying this DAB signal by one valid symbol period.

Figure 2:
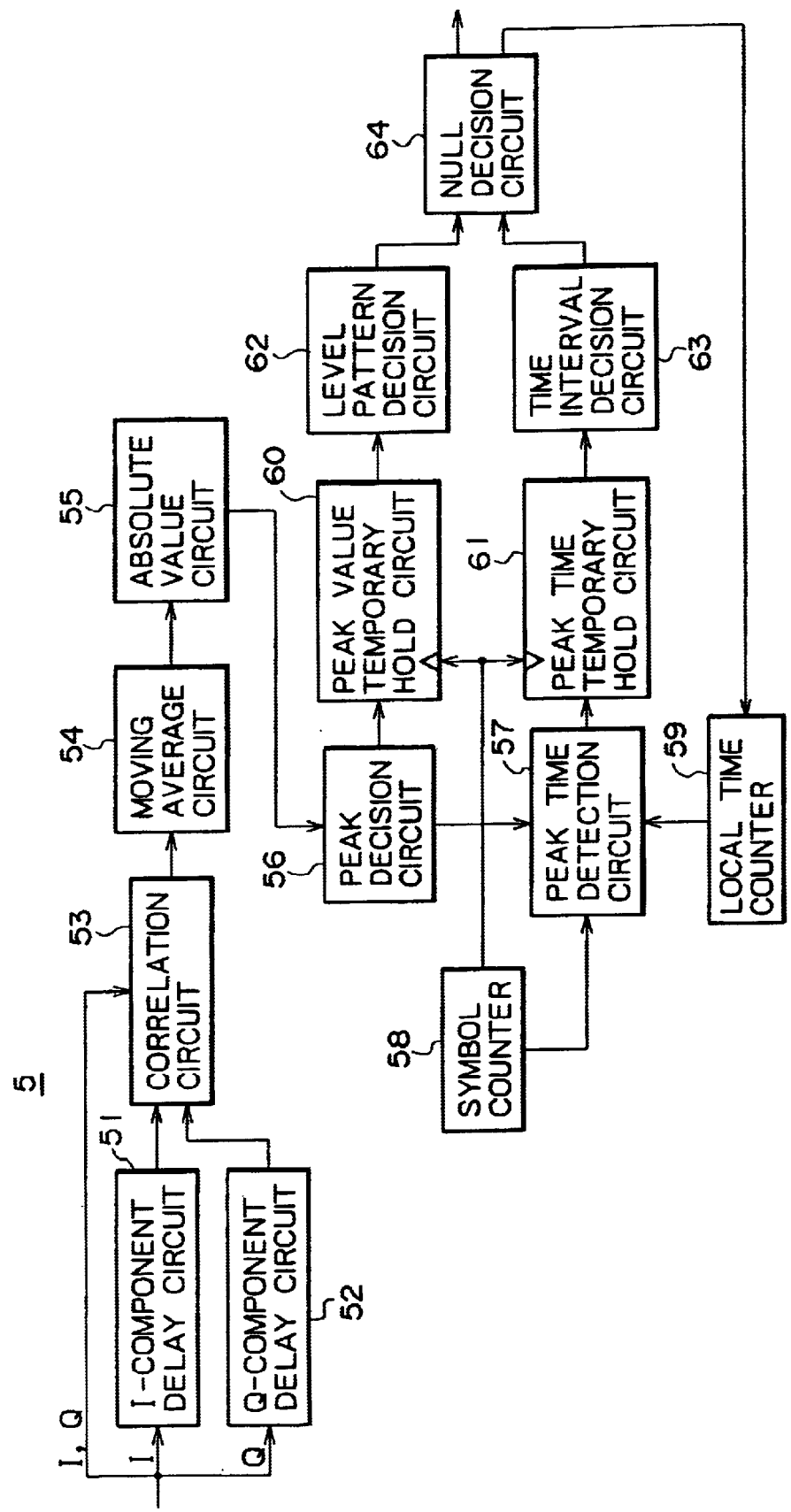
FIG. 2 is a block diagram illustrating an AFC of the receiver shown in FIG. 1.

FIG. 2 is a block diagram illustrating the configuration of the above-mentioned AFC 5. As shown, the AFC 5 comprises an I-component delay circuit 51, a Q-component delay circuit 52, a correlation circuit 53, a moving average circuit 54, an absolute value circuit 55, a peak decision circuit 56, a peak time detection circuit 57, a symbol counter 58, a local time counter 59, a peak value temporary hold circuit 60, a peak time temporary hold circuit 61, a level pattern decision circuit 62, a time interval decision circuit 63, and a null decision circuit 64.

As described, the I-component and Q-component signals of the baseband signal are supplied from the I/Q demodulator 4 to the AFC 5. The I-component signal I and the Q-component signal Q are supplied to the correlation circuit 53. At the same time, the I-component signal I is supplied to the I-component delay circuit 51 and the Q-component signal Q is supplied to the Q-component delay circuit 52.

The I-component delay circuit 51 delays the supplied I-component signal I by one valid symbol period and supplies the resultant delay signal Id to the correlation circuit 53. Likewise, the Q-component delay circuit 52 delays the supplied Q-component signal Q by one valid symbol period and supplies a resultant delay signal Qd to the correlation circuit 53.

The correlation circuit 53 correlates the I-component signal I, the Q-component signal Q, and their delay signals Id and Qd. Namely, the correlation circuit 53 obtains a correlation value Ir for the I-component signal I and a correlation value Qr for the Q-component signal Q from the following equations (1) and (2):

$$\text{Correlation value } Ir = I \times Id + Q \times Qd \quad (1)$$

$$\text{Correlation value } Qr = Q \times Id - I \times Qd \quad (2)$$

The correlation values (complex vectors) computed by the correlation circuit 53 are supplied to the moving average circuit 54. For the correlation values Ir and Qr, the moving average circuit 54 computes moving averages Ia and Qa for a period equal to guard band period and supplies the computed Ia and Qa to the absolute value circuit 55.

The moving averages are obtained for the correlation values Ir and Qr to cause a peak in the boundary between transmission symbols of the DAB signal. FIGS. 3A and 3B illustrate an operation in which the moving averages of the correlation values Ir and Qr are peaked in the boundary of transmission symbols.

Figure 5:
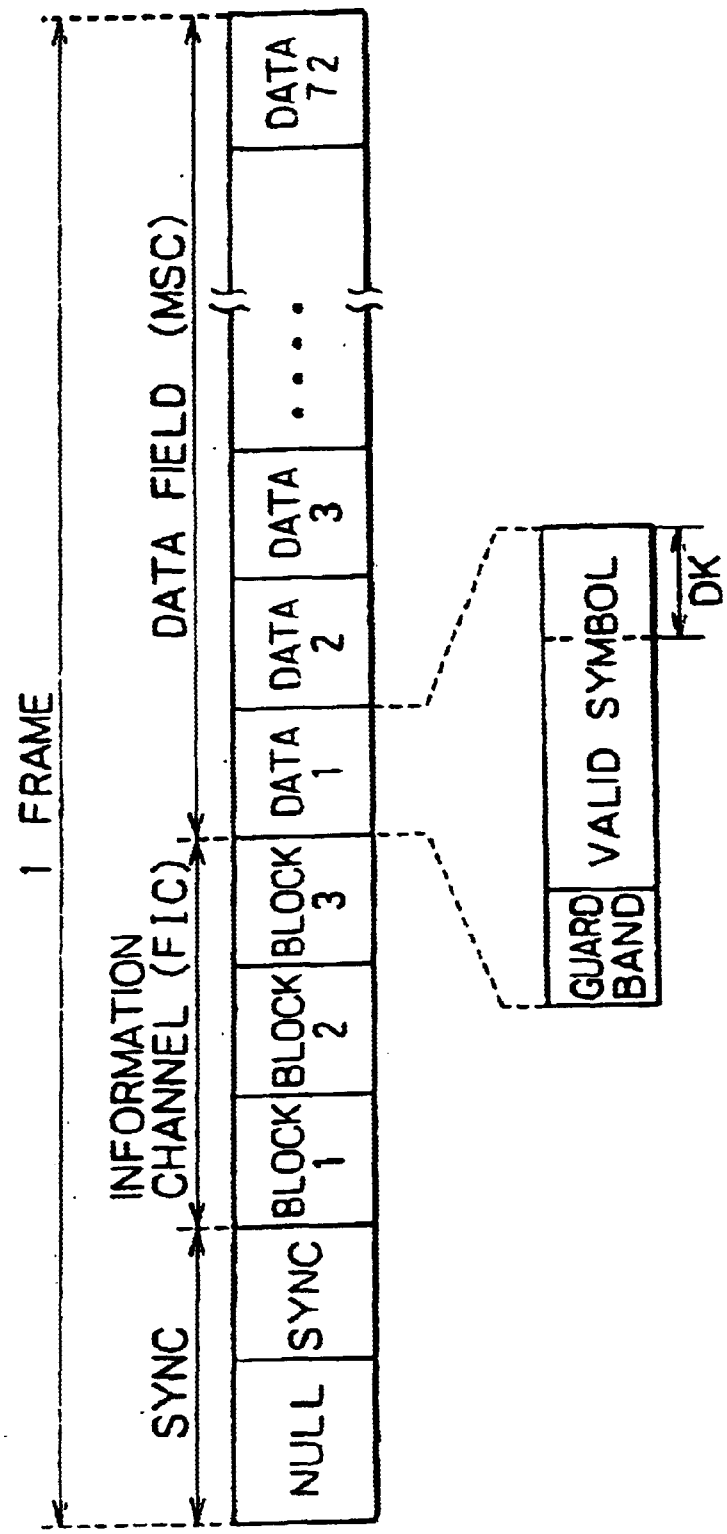
FIG. 5 is a diagram illustrating a frame structure of DAB signal.
Figure 6A:
FIG. 6A and FIG. 6B are diagrams illustrating analog processing for detecting a null symbol position from a DAB signal.
Figure 6B:
Figure 7A:
FIG. 7A and FIG. 7B are diagrams illustrating a problem in the analog processing of null symbol position detection from a DAB signal.
Figure 7B:

As described with reference to FIG. 5, in each transmission symbol of the DAB signal, the guard band period information is the same as the information of the period DK having the same length as the period of the guard band at the end of each valid symbol. Hence, as shown in FIG. 3A, a correlation value between the information of the period DK at the end of each valid symbol and the guard band period information is obtained by obtaining a correlation between the DAB signal and a signal obtained by delaying the DAB signal by one valid symbol period.

Because the guard band period information is the same as the information of the period DK of each valid symbol, when the moving average of the correlation value between the DAB signal and the signal obtained by delaying this DAB signal by one valid symbol period is obtained for the period having the same length as the guard band period, the value of the moving average of the correlation value is maximized in positions P1, P2, P3, and so on at the end of the transmission symbols (or in the boundary between the transmission symbols).

Namely, in the boundary between transmission symbols, the value of the moving average for the guard band of the correlation value is maximized, so that, in a period where transmission symbols continue in a row, the moving average of the correlation value peaks every 1 ms which is the length of transmission symbol period.

If the correlation between a DAB signal and a signal obtained by delaying the DAB signal by one symbol period and, in the neighborhood of null symbol, a correlation value between null symbol and valid symbol, a correlation value between null symbol and null symbol, and a correlation value between block 1 and null symbol as shown in FIG. 3B, the level of correlation in the obtained correlation values is low because there is no transmission information to be transmitted as data as described above.

Consequently, in the period where transmission symbols continue in a row, the moving average of correlation value peaks every symbol period (every 1 ms), while the peak level of moving average is very low in null symbol portion. Hence, as shown in FIG. 3B, the period between moving average high-level peak occurrence position Pe of the correlation value immediately before a null symbol and next high-level peak occurrence position Ps is the period obtained by adding null symbol period and block 1 period. This indicates that the occurrence period of the high-level peak of correlation value moving average is different from the period in which transmission symbols continue in a row.

In the case of a DAB signal, the periods of symbols other than null symbol have a same length but the length of null symbol period is greater than those of other symbols by about several 10 μs.

Also in the present embodiment, a moving average peak is obtained from the absolute value of moving average (complex vector) to detect the occurrence period of the peak as will be described, thereby detecting null symbol position. Namely, null symbol position is detected by use of vector phase difference information.

That is, in order to detect the peak of the moving average of correlation values Ia and Qa, the absolute value circuit 55 performs computation, absolute value $S = Ia^2 + Qa^2$, obtaining a sum of a square of moving average Ia and a square of moving average Qa. On the basis of the obtained sum, this circuit computes absolute value S of the moving average (complex vector) and supplies the obtained absolute value S to the peak decision circuit 56.

The peak decision circuit 56 compares the absolute value S supplied last time and the absolute value S supplied this time and keeps the larger one in the peak decision circuit 56. The peak decision circuit 56 may also compare the absolute value S supplied from the absolute value circuit 55 with a preset threshold for example before comparing the previously supplied absolute value S with the newly supplied absolute value S, thereby regarding the absolute value S smaller than the threshold as no peak.

When an absolute value S has been supplied, the peak decision circuit 56 notifies the peak time detection circuit 57 thereof. Upon reception of this notification, the peak time detection circuit 57 detects time information (a count value) indicative of the occurrence point of the absolute value S from the local time counter 59 and holds the detected count value.

In response to the a timing signal supplied from the symbol counter 58, the peak value temporary hold circuit 60 latches the absolute value S (the peak) held in the peak decision circuit 56. Likewise, in response to a timing signal supplied from the symbol counter 58, the peak time temporary hold circuit 61 latches the time information (peak time) held in the peak time detection circuit 57.

The symbol counter 58 generates one clock of timing signal every one symbol period of a DAB signal. The local time counter 59 performs count processing with a clock of about 1.5 μs for example, completing one cycle in one frame of a DAB signal.

Therefore, the receiver of the present embodiment receives a DAB signal of mode 1 as described above, so that the symbol counter 58 generates a clock signal of symbol unit time and the local time counter 59 performs count processing by a clock signal of 1.5 μs for example to complete one cycle in 96 ms.

Thus, the peak value temporary hold circuit 60 latches the peak of the moving average of the correlation value that is maximized in the boundary between transmission symbols and the peak time temporary hold circuit 61 latches the peak time indicative of the occurrence time of the peak latched by the peak value temporary hold circuit 60.

Then, the peak value temporary hold circuit 60 supplies the peak supplied from the peak decision circuit 56 to the level pattern decision circuit 62. The peak time temporary hold circuit 61 supplies the peak time supplied from the peak time detection circuit 57 to the time interval decision circuit 63.

It should be noted that the peak value temporary hold circuit 60 and the peak time temporary hold circuit 61 latch peak and peak time respectively in response to the timing signals supplied from the symbol counter 58, supply the latched information to the level pattern decision circuit 62 and the time interval decision circuit 63 respectively, and then clear the peak and the peak time upon receiving next timing signals supplied from the symbol counter 58.

The level pattern decision circuit 62 is adapted to hold n (n being an integer of 2 or higher) peaks. The time interval decision circuit 63 can hold n peak times corresponding to n peaks held in the level pattern decision circuit 62. In the present embodiment, the level pattern decision circuit 62 can hold 3 peaks. The time interval decision circuit 63 can hold 3 peak times.

The level pattern decision circuit 62 determines whether a null symbol has been received on the basis of the level pattern of the 3 peaks held in it. Namely, as described with reference to FIGS. 3A and 3B, during the period in which transmission symbols continue in a row, the peak of the moving average of correlation values is at high level and the peak takes place for every transmission symbol period. However, in a null symbol period, which is longer than a transmission symbol period, the peak of the moving average of correlation values is at low level. In this case, the interval between adjacent peaks of high level is broader.

Hence, if at least one of the 3 peaks captured in the level pattern decision circuit 62 is at low level, it is determined that a null symbol period is included. If the presence of a null symbol is determined because of the presence of a low-level peak, then the time interval decision circuit 63 obtains the time interval between peaks.

Then, the time interval decision circuit 63 determines whether the length of the time interval between peaks including a null symbol matches the length in the case where the null symbol of the DAB signal in mode 1 is included. Consequently, the time interval decision circuit 63 can determine whether the interval found including a null symbol truly includes a null symbol.

The information indicative of the decision results supplied from the level pattern decision circuit 62 and the time interval decision circuit 63 is supplied to the null decision circuit 64. Then, as described, if a null symbol is detected by the time interval decision circuit 64, the null decision circuit 64 obtains a local time of the final end of this frame on the basis of the peak supplied from the level pattern decision circuit 62 for every symbol period, the supply timing of this peak, or the peak time supplied from the time interval decision circuit 63. The null decision circuit 64 supplies the obtained local time to the local time counter 59 at the final end of this frame.

Receiving the local time from the null decision circuit 64, the local time counter 59 resets the current count value and starts counting from "O" at the beginning of the null symbol of each frame of the received and tuned-in DAB signal. The null decision circuit 64 is adapted to supply a null symbol detection signal to the controller 11 of the present embodiment at the beginning of the null symbol.

Thus, the AFC 5 of the present embodiment functions as a null symbol position detecting apparatus. The null symbol detecting circuit is composed of the level pattern decision circuit 62, the time interval decision circuit 63, and the null symbol decision circuit 64. In the present embodiment, the position of the null symbol of the received and tuned-in DAB signal, namely the beginning of each frame, can be detected by digital processing.

The following describes, with reference to flowchart shown in FIG. 4, the null symbol detection processing to be performed by the level pattern decision circuit 62, the time interval decision circuit 63, and the null symbol decision circuit 64. As described, the null symbol detection processing shown in FIG. 4 is executed immediately after the reception and tune-in of a DAB signal, after changing channels by the receiver of the present embodiment, or after a temporary signal drop and restoration therefrom in a very weak electromagnetic field environment such as inside a tunnel.

The level pattern decision circuit 62 determines whether a new peak has been supplied from the peak value temporary hold circuit 60 (step S201). If no new peak is found supplied, the level pattern decision circuit 62 repeats the processing of step S201. If a new peak is found supplied, the level pattern decision circuit 62 compares levels of past n (for example, 3) peaks including the newly supplied peak held in the circuit 62 (step S202) to determine whether there is any low-level peak (step S203).

If no low-level peak is found by the level pattern decision circuit in step S203, the level pattern decision circuit 62 deletes the oldest of the n peaks held in it (step S207) and repeats the processing of step S201 and on.

If, in step S203, one low-level peak is found by the level pattern decision circuit 62, namely the level pattern decision circuit 62 has determined it is highly possible that this period is a period including a null symbol, the time interval decision circuit 63 computes the time interval of the period between the peaks that includes the null symbol on the basis of the peak time corresponding to each peak (step S204).

Then, the time interval decision circuit 63 determines whether the computed peak-to-peak time interval matches the length of the period including the null symbol of the corresponding mode (step S205). Namely, if this period is a period that includes a null symbol, the peak-to-peak interval is a sum of the length of null symbol period and the length of transmission symbol (block 1 in FIG. 3B) period as described with reference to FIG. 3B. On the other hand, if it is a period in which transmission symbols continue in a row but only one of the peaks of correlation value moving average merely dropped for some reason, the length of the peak-to-peak period only becomes twice as high as the transmission symbol period.

It should be noted that, as described with reference to FIG. 3B, the length of the null symbol period can be computed by subtracting the length of the period for one transmission symbol from the length of the period between peaks Pe and Ps. The matching can be determined by comparing the computed length of null symbol period with the length of null symbol period of a target mode.

If the length of the computed peak-to-peak time interval is found not matching the length of the period including a null symbol of the corresponding mode in step S205, the level pattern decision circuit 62 deletes the oldest of the n peaks held in it (step S207) and repeats the processing of step S201 and on.

If the length of the computed peak-to-peak time interval is found matching the length of the period including a null symbol by the time interval decision circuit 63, the null symbol decision circuit 64 obtains the local time at the final end of each DAB signal frame on the basis of the information supplied from the level pattern decision circuit 62 and the information such as the peak time supplied from the time interval decision circuit 63. The null decision circuit 64 sets the obtained local time to the local time counter 59 (step S206) at the final end of that frame.

When the local time is supplied from the null decision circuit 64, the local time counter 59 is reset. Subsequently, the local time counter 59 starts always with "0" at the beginning of the null symbol of the received signal.

As described, the null decision circuit 64 supplies a null symbol detection signal at the beginning of each frame to the controller 11. This allows the controller 11 to correctly obtain the frequency offset of the received signal, thereby quickly and accurately correcting this frequency offset by controlling the VCXO13.

Thus, in the present embodiment, the null symbol position of a received signal is detected by digital processing by considering the correlation of the received signals. Consequently, the null symbol position is always detected quickly and correctly without being affected by the reception level of a received DAB signal even if the reception level fluctuates due to fading or the like.

As described, the length of the period in which the possibility of null symbol inclusion is high is matched against the length of the period in which the null symbol of the broadcast signal of a target mode is included. This prevents a transmission symbol period in which a high-level peak is missing by chance from being mistakenly determined as a null symbol period.

Namely, it is determined whether the length of a null symbol period obtained by computation matches the length of a null symbol period of a DAB signal of a target mode. This securely prevents the erroneous detection of null symbols.

In the above-mentioned embodiment, a correlation value between a received and tuned-in DAB signal and a signal obtained by delaying this DAB signal by one valid symbol period is obtained and the moving average for the same period as the length of the period of the guard band of this obtained correlation value, thereby causing the moving average to peak in the boundary between received symbols. However, the same purpose can also be attained without use of moving average.

Namely, as described with reference to FIG. 3A, only obtaining the correlation value between the information of the period DK at the end of a valid symbol and the information of guard band period raises the correlation value in that period. The period in which the correlation value is raised is different between the period in which received symbols continue in a row and the period in which a null symbol is included. Therefore, detection of the difference in the period of the correlation value rise between transmission symbol period and null symbol period can detect a null symbol.

A high-level correlation value continuing for a period of the same length as the guard band is followed by the beginning of a next transmission symbol. Use of this information can identify the local time at the final end of that frame and set the local time at that final end to the local time counter 59, thereby resetting the same.

In the above-mentioned embodiment, null symbol reception is determined by a peak occurrence pattern. If a null symbol is found received, the time interval between peaks is computed to determine whether a null symbol has been truly received or not. However, the present invention is not limited to this configuration.

For example, when a null symbol is found received by the determination based on the peak occurrence pattern, the position of the received null symbol may be identified for null symbol detection. Alternatively, only the time interval between peaks adjacent in time may be monitored for the detection of null symbol position.

Namely, a null symbol position may be detected on the basis of the information about the change in peak occurrence period or the information about peak occurrence pattern. Additional consideration of the time interval between peaks as the change in peak occurrence period can surely prevent the erroneous detection of null symbols.

Also when merely using a correlation value as with the case in which a peak of moving average is used for a correlation value, a null symbol position may be detected on the basis of the information about the change in peak occurrence period or the information about peak occurrence pattern.

The above-mentioned receiver of the present embodiment has been described by use of an example in which a DAB signal of mode 1 is received. The DAB signals that can be received and tuned in by this receiver are not limited to the mode 1 signal. Namely, the receiver can also handle the DAB signals of mode 2 and mode 3 for example.

The receiver can also be adapted to receive and process only the mode 1 DAB signal. In addition, the receiver can also be adapted to receive and tune in the broadcast signals of all modes such as mode 1, mode 2, and mode 3. In this case, a null symbol position is detected according to the mode of a received and tuned-in DAB signal by switching between the DAB signal modes according to the received and tuned-in broadcast signal or by the operator of this receiver.

Further, the null symbol position detecting apparatus according to the present invention shown in FIG. 2 may be formed and installed on various receivers.

It will be apparent that the present invention is not only applicable to DAB signals. The present invention is also applicable to various types of digital audio broadcast signals and various terrestrial digital television signals having a null symbol, using OFDM, and having a guard band period.

The present invention is applicable to not only broadcast signals but also various transmission signals on which null symbols and transmission symbols are multiplexed in a time division manner, each transmission symbol being composed of a guard band and a valid symbol, the information of the guard band being the same as the information about a part of the valid symbol.

As mentioned above and according to the invention, a null symbol position is detected by use of the correlation between received signals, thereby quickly and accurately detecting a null symbol position if the reception level of a received signal changes due to fading for example. Consequently, the novel configuration can quickly and accurately obtain the frequency offset of a received signal and quickly correct the obtained frequency offset to make the broadcast signal available always in a quick and good state.

In addition, a null symbol position is detected by digital processing. Consequently, unlike analog received signals, a null symbol can be quickly and accurately detected from a received signal without causing a delay in null symbol detection.

While the preferred embodiments of the present invention have been described using specific terms, such description is for illustrative purposes only, and it is to be understood that changes and variations may be made without departing from the spirit or scope of the appended claims.

What is claimed is:

1. A null symbol position detecting method for receiving a signal and detecting a null symbol position from the received signal, wherein a unit transmission frame of the received signal has at least a null symbol at a beginning of said unit transmission frame and a plurality of transmission symbols following said null symbol, each of said plurality of transmission symbols having a guard band and a valid symbol, wherein information included in a period of said guard band is made equal to information included in said valid symbol, and wherein a length of a period of said null symbol is different than a length of a period of each of said plurality of transmission symbols, said method comprising the steps of:

computing a correlation value between said received signal and a signal obtained by delaying said received signal by a time equal to a period of said valid symbol;

computing a moving average for a period equal to said period of said guard band for said correlation value between said received signal and a signal obtained by delaying said received signal by a time equal to a period of said valid symbol; and detecting said null symbol position based on a variation in correlation value during a period in which the computed moving average peaks.

2. The null symbol position detecting method according to claim 1, wherein said null symbol position is detected based on a time interval in which said computed moving average peaks.

3. A null symbol position detecting method for receiving a signal and detecting a null symbol position from the received signal, wherein a unit transmission frame of the received signal has at least a null symbol at a beginning of said unit transmission frame and a plurality of transmission symbols following said null symbol, each of said plurality of transmission symbols having a guard band and a valid symbol, wherein information included in a period of said guard band is made equal to information included in said valid symbol, and wherein a length of a period of said null symbol is different than a length of a period of each of said plurality of transmission symbols, said method comprising the steps of:

computing a correlation value between said received signal and a signal obtained by delaying said received signal by a time equal to a period of said valid symbol;

computing a moving average for a period equal to said period of said guard band for said correlation value between said received signal and a signal obtained by delaying said received signal by a time equal to a period of said valid symbol; and detecting said null symbol position based on an occurrence pattern in which said moving average peaks.

4. A null symbol position detecting method for receiving a signal and detecting a null symbol position from the received signal, wherein a unit transmission frame of the received signal has at least a null symbol at a beginning of said unit transmission frame and a plurality of transmission symbols following said null symbol, each of said plurality of transmission symbols having a guard band and a valid symbol, wherein information included in a period of said guard band is equal to information included in said valid symbol, and wherein a length of a period of said null symbol is different than a length of a period of each of said plurality of transmission symbols, said method comprising the steps of:

computing a correlation value between said received signal and a signal obtained by delaying said received signal by a time equal to a period of said valid symbol;

computing for said correlation value a moving average for a period equal to said period of said guard band to detect peaking of said moving average; and detecting said null symbol position based on an occurrence pattern in which said moving average peaks and a time interval in which said moving average peaks.

5. A null symbol position detecting apparatus for receiving a signal and detecting a null symbol position from the received signal, wherein a unit transmission frame of the received signal has at least a null symbol at a beginning of said unit transmission frame and a plurality of transmission symbols following said null symbol, each of said plurality of transmission symbols having a guard band and a valid symbol, wherein information included in a period of said guard band is made equal to information included in said valid symbol, and wherein a length of a period of said null symbol is different than a length of a period of each of said plurality of transmission symbols, said apparatus comprising:

a delay circuit for delaying said received signal by a time equal to a period of said valid symbol;

a correlation value computing circuit for computing a correlation value between said received signal and the received signal delayed by said delay circuit;

a moving average computing circuit receiving said correlation value from said correlation value computing circuit and computing, for said correlation value, a moving average for a time equal to said period of said guard band;

a peak detecting circuit for detecting a peak of said moving average computed by said moving average computing circuit; and a null symbol detecting circuit receiving said correlation value from said correlation value computing circuit for detecting the correlation value over a predetermined level, and for detecting said null symbol position based on a variation in a period of said peak of said moving average detected by said peak detecting circuit.

6. The null symbol position detecting apparatus according to claim 5, wherein said null symbol position is detected based on a time interval between successive peaks detected by said peak detecting circuit.

7. A null symbol position detecting apparatus for receiving a signal and detecting a null symbol position from the received signal, wherein a unit transmission frame of the received signal has at least a null symbol at a beginning of said unit transmission frame and a plurality of transmission symbols following said null symbol, each of said plurality of transmission symbols having a guard band and a valid symbol, wherein information included in a period of said guard band is equal to information included in said valid symbol, and wherein a length of a period of said null symbol is different than a length of a period of each of said plurality of transmission symbols, said apparatus comprising:

a delay circuit for delaying said received signal by a time equal to a period of said valid symbol;

a correlation value computing circuit for computing a correlation value between said received signal and the received signal delayed by said delay circuit;

a moving average computing circuit receiving said correlation value from said correlation value computing circuit for computing, for said correlation value, a moving average for a time equal to said period of said guard band;

a Peak detecting circuit for detecting a peak of said moving average computed by said moving average computing circuit, and a null symbol detecting circuit for detecting said null position based on an occurrence pattern of said peak of said moving average detected by said peak detecting circuit.

8. A null symbol position detecting apparatus for receiving a signal and detecting a null symbol position from the received signal, wherein a unit transmission frame of the received signal has at least a null symbol at a beginning of said unit transmission frame and a plurality of transmission symbols following said null symbol, each of said plurality of transmission symbols having a guard band and a valid symbol, wherein information included in a period of said guard band is equal to information included in said valid symbol at an end thereof, and wherein a length of a period of said null symbol is different than a length of a period of each of said plurality of transmission symbols, said apparatus comprising:

a delay circuit for delaying said received signal by a time equal to a period of said valid symbol;

a correlation value computing circuit for computing a correlation value between said received signal and the received signal delayed by said delay circuit;

a moving average computing circuit receiving said correlation value from said correlation value computing circuit for computing, for said correlation value, a moving average for a time equal to said period of said guard band;

a peak detecting circuit for detecting a peak of said moving average computed by said moving average computing circuit; and a null symbol detecting circuit for detecting said null symbol position based on an occurrence pattern of said peak detected by said peak detecting circuit and a time interval between successive peaks detected by said peak detecting circuit.

9. A receiver for receiving a transmission signal in which a unit transmission frame of the transmission signal has at least a null symbol at a beginning of said unit transmission frame and a plurality of transmission symbols following said null symbol, each of said plurality of transmission symbols having a guard band and a valid symbol, wherein information included in a period of said guard band is equal to information included in said valid symbol, and wherein a length of a period of said null symbol is different than a length of a period of each of said plurality of transmission symbols, said receiver comprising:

a receiving and tuning-in circuit for receiving and tuning-in the transmission signal;

a demodulating circuit for demodulating the transmission signal received and tuned-in by said receiving and tuning-in circuit;

a delay circuit for delaying the demodulated transmission signal from said demodulating circuit by a time equal to a period of said valid symbol;

a correlation value computing circuit for computing a correlation value between said received signal and the received signal delayed by said delay circuit;

a moving average computing circuit receiving said correlation value from said correlation value computing circuit for computing, for said correlation value, a moving average for a time equal to said period of said guard band;

a peak detecting circuit for detecting a peak of said moving average computed by said moving average computing circuit;

a null symbol detecting circuit receiving said correlation value from said correlation value computing circuit for detecting the correlation value over a predetermined level and for detecting said null symbol position based on a variation in a period of said peak of said moving average detected by said moving average detecting circuit; and an adjusting circuit for adjusting said received signal in said receiving and tuning-in circuit by use of said null symbol position detected by said null symbol detecting circuit.

10. The receiver according to claim 9, wherein said null symbol position is detected based on a time interval between successive peaks of said moving average.

11. A receiver for receiving a transmission signal in which a unit transmission frame has at least a null symbol at a beginning of said unit transmission frame and a plurality of transmission symbols following said null symbol, each of said plurality of transmission symbols having a guard band and a valid symbol, wherein information included in a period of said guard band is equal to information included in said valid symbol, and wherein a length of a period of said null symbol is different than a length of a period of each of said plurality of transmission symbols, said receiver comprising:

a receiving and tuning-in circuit for receiving and tuning-in the transmission signal;

a demodulating circuit for demodulating the transmission signal received and tuned-in by said receiving and tuning-in circuit;

a delay circuit for delaying the demodulated transmission signal from said demodulating circuit by a time equal to a period of said valid symbol;

a correlation value computing circuit for computing a correlation value between said received signal and the received signal delayed by said delay circuit;

a moving average computing circuit receiving said correlation value from said correlation value computing circuit for computing, for said correlation value, a moving average for a time equal to said period of said guard band; and a peak detecting circuit for detecting a peak of said moving average computed by said moving average computing circuit;

a null symbol detecting circuit for detecting said null symbol position by using as said correlation value the peak of said moving average detected by said peak detecting circuit; and an adjusting circuit for adjusting said received signal in said receiving and tuning-in circuit by use of said null symbol position detected by said null symbol detecting circuit.

12. A receiver for receiving a transmission signal in which a unit transmission frame has at least a null symbol at a beginning of said unit transmission frame and a plurality of transmission symbols following said null symbol, each of said plurality of transmission symbols having a guard band and a valid symbol, wherein information included in a period of said guard band is equal to information included in said valid symbol, and wherein a length of a period of said null symbol is different than a length of a period of each of said plurality of transmission symbols, said receiver comprising:

a receiving and tuning-in circuit for receiving and tuning-in the transmission signal;

a demodulating circuit for demodulating the transmission signal received and tuned-in by said receiving and tuning-in circuit;

a delay circuit for delaying the demodulated transmission signal from said demodulating circuit by a time equal to a period of said valid symbol;

a correlation value computing circuit for computing a correlation value between said received signal and the received signal delayed by said delay circuit;

a moving average computing circuit receiving said correlation value from said correlation value computing circuit for computing, for said correlation value, a moving average for a time equal to said period of said guard band;

a peak detecting circuit for detecting a peak of said moving average computed by said moving average computing circuit;

a null symbol detecting circuit for detecting said null symbol position based on an occurrence pattern of said peak of said moving average from said peak detecting circuit and a time interval between successive peaks of said moving average; and an adjusting circuit for adjusting said received signal in said receiving and tuning-in circuit by use of said null symbol position detected by said null symbol detecting circuit.

\* \* \* \* \*